(12) United States Patent
Etorre (10) Patent No.: US 11,525,548 B2
(45) Date of Patent: Dec. 13, 2022

(54) SYSTEM AND METHOD FOR POSITIONING LUMINAIRE HEADS

(71) Applicant: Schreder S.A., Brussels (BE)

(72) Inventor: Laurent Etorre, Schaerbeek (BE)

(73) Assignee: Schreder S.A., Brussels (BE)

( * ) Notice: Subject to any disclaimer, the term of this patent is extended or adjusted under 35 U.S.C. 154(b) by 162 days.

(21) Appl. No.: 16/960,296

(22) PCT Filed: Jan. 7, 2019

(86) PCT No.: PCT/EP2019/000002
§ 371 (c)(1),
(2) Date: Jul. 6, 2020

(87) PCT Pub. No.: WO2019/134899
PCT Pub. Date: Jul. 11, 2019

(65) Prior Publication Data
US 2020/0344863 A1 Oct. 29, 2020

(30) Foreign Application Priority Data
Jan. 5, 2018 (BE) .................................... 20185003

(51) Int. Cl.
*F21S 8/08* (2006.01)
*H05B 47/175* (2020.01)
(Continued)

(52) U.S. Cl.
CPC ............. *F21S 8/086* (2013.01); *F21V 21/116* (2013.01); *F21V 21/30* (2013.01); *F21V 23/003* (2013.01);
(Continued)

(58) Field of Classification Search
CPC ........ F21S 8/086; F21V 21/116; F21V 21/30; H05B 47/105; H05B 47/115;
(Continued)

(56) References Cited

U.S. PATENT DOCUMENTS

2007/0057807 A1* 3/2007 Walters .................. H05B 47/22
340/7.29
2016/0328960 A1* 11/2016 Broers .................... G08G 1/048
(Continued)

FOREIGN PATENT DOCUMENTS

GB 2403357 A * 12/2004 ........... H05B 37/034
GB 2403357 A 12/2004
(Continued)

OTHER PUBLICATIONS

PCT International Search Report and Written Opinion, PCT International Application No. PCT/EP2019/000002, dated Mar. 14, 2019.

*Primary Examiner* — Raymond R Chai
(74) *Attorney, Agent, or Firm* — McDonnell Boehnen Hulbert & Berghoff LLP (57) ABSTRACT

A luminaire control system comprising a plurality of luminaire heads and a remote device; wherein each luminaire head comprises: a sensor assembly for measuring at least one tilt angle for an angular positioning of the luminaire head, and a control module for controlling the sensor assembly to perform measurements during a first period upon activation of the luminaire head after installation thereof on a mounting base, and for controlling communication such that measurement data from said first period and an identification of the luminaire head is communicated to the remote device; wherein the remote device is configured to determine position information data for each luminaire head, based on the received measurement data, indicating whether the luminaire head is positioned correctly; and the luminaire control system further comprising at least one notification module for receiving the position information data from the remote device and for notifying a field operator accordingly.

18 Claims, 7 Drawing Sheets

(51) Int. Cl.
- *H05B 47/105* (2020.01)
- *F21V 21/116* (2006.01)
- *F21V 21/30* (2006.01)
- *F21V 23/00* (2015.01)
- *F21V 23/04* (2006.01)
- *H05B 47/19* (2020.01)
- *H05B 47/115* (2020.01)

(52) U.S. Cl.
CPC ....... *F21V 23/0492* (2013.01); *H05B 47/105* (2020.01); *H05B 47/115* (2020.01); *H05B 47/175* (2020.01); *H05B 47/19* (2020.01)

(58) Field of Classification Search
CPC ...... H05B 47/175; H05B 47/19; Y02B 20/40; F12V 23/003; F12V 23/0492; F12V 23/0457

See application file for complete search history.

(56) References Cited

U.S. PATENT DOCUMENTS

| | | | |
|---|---|---|---|
| 2017/0205061 A1* | 7/2017 | Broers | H05B 47/155 |
| 2017/0215256 A1* | 7/2017 | Abbattista | H05B 47/19 |
| 2017/0307149 A1* | 10/2017 | Clark | H05B 45/50 |

FOREIGN PATENT DOCUMENTS

| | | | |
|---|---|---|---|
| WO | 2015101647 A1 | 7/2015 | |
| WO | 2016008746 A1 | 1/2016 | |
| WO | 2016016838 A1 | 2/2016 | |

* cited by examiner

SYSTEM AND METHOD FOR POSITIONING LUMINAIRE HEADS

CROSS-REFERENCE TO RELATED APPLICATION

The present application is a national stage entry of PCT/EP2019/000002 filed on Jan. 7, 2019, which claims priority to BE 20185003 filed on Jan. 5, 2018, the contents of each of which are hereby incorporated by reference.

FIELD OF INVENTION

The present invention relates to systems and methods for positioning luminaire heads, in particular during installation thereof.

BACKGROUND

It is known to provide a lighting apparatus with a control and communication circuit with a sensor adapted to measure a quantity related to the inclination of the lighting apparatus. The sensor allows the control and communication device to send to a remote control device a datum relative to the inclination, or an inclination change, of the lighting apparatus. For example, the sensor is an acceleration sensor. The measurements provided by the sensor can for example be processed locally but, alternatively or in addition, can also be processed by the remote control device. Thanks to the provision of the sensor, the control and communication circuit can remotely communicate data related to the inclination of the lighting apparatus to allow detecting an accidental change of inclination due for example to the action of the weather or environmental conditions, such as, for example, the wind or vegetation, that vary the inclination with respect to the inclination conditions set in the installation step or a change due for example to the support being knocked down by a traffic accident or an inclination due to the subsidence of the foundation base. The control and communication device may store a datum related to the inclination set during the installation step, for example, acquired via the sensor, to estimate variations of inclination (via the sensor) and to send to the remote control device alarm messages related to variations of inclination that, exceeding a predetermined threshold, require maintenance of the lighting apparatus and/or the support pole.

SUMMARY

The object of embodiments of the invention is to provide an improved system and method for positioning luminaire heads, especially during installation. More in particular, embodiments of the invention aim to provide a system and method which allow the notification of an angular position of the luminaire head with respect to a mounting base for a more apparent determination of the positioning of the luminaire head and a more accurate correction of its angular position.

According to a first aspect of the invention there is provided a luminaire control system. The luminaire control system comprises a plurality of luminaire heads and a remote device. Each luminaire head of the plurality of luminaire heads comprises:

a sensor assembly configured for measuring at least one tilt angle ($\theta$, $\psi$, $\varphi$) representative for an angular positioning of the luminaire head;

a communication interface configured for communicating with the remote device;

a control module configured for controlling the sensor assembly to perform measurements during a first period upon activation of the luminaire head after installation thereof on a mounting base; and for controlling the communication through the communication interface such that measurement data from said first period and an identification of the luminaire head is communicated to the remote device.

The remote device is configured to determine position information data for each luminaire head, based on the received measurement data, said position information data indicating whether the luminaire head is positioned correctly, and optionally comprising information about the required correction. The luminaire control system further comprises at least one notification module configured for receiving the position information data from the remote device and for notifying a field operator accordingly.

Embodiments of the invention are based inter alia on the insight that the design of a luminaire solution for a specific lighting demand includes intervals between luminaires, heights of the luminaire heads, but also a precise angular positioning of the luminaire heads. However, although checking the intervals and heights of the luminaire heads can be straightforward, verifying the angular position of the luminaire heads can be cumbersome. This problem is overcome by a luminaire control system as defined above.

In embodiments of the invention, the luminaire control system is for controlling a plurality of luminaire heads and is associated to a remote device to be able to have an overview of the situation of the plurality of luminaire heads without the need for checking manually the positioning of each of the plurality of the luminaire heads. The angular positioning of each luminaire head is measured thanks to a sensor assembly upon first activation of the luminaire head immediately after installation on the mounting base. In that manner, the notification module can notify the field operator whilst still present at the premises where the plurality of luminaire heads have been installed. Further, notifications at the premises remove the need for automatic angular adjustments which would represent a higher cost.

The data measured by the sensor assembly is sent via a communication interface to the remote device. The control module is adapted for controlling the communication. From the measurement data, the remote device is adapted to determine position information data indicating whether the luminaire head is positioned correctly. Then, the remote device may optionally determine the angular correction needed. A notification module provided to the luminaire head is adapted to receive the position information data from the remote device and to notify the field operator accordingly. This allows a more accurate positioning of each luminaire head of the plurality of luminaire heads and an improved way to determine the correction needed and where to apply the correction.

In an embodiment according to the present invention, the remote device is remote from at least one luminaire of a plurality of luminaires. The remote device may be comprised in the at least one luminaire of the plurality of luminaires or in a cabinet near the plurality of luminaires.

According to a preferred embodiment, the at least one notification module comprises a plurality of luminaire notification modules included in the plurality of luminaires. In this way, the notifications may be sent independently from each of the plurality of luminaire heads depending on the working mode, e.g. audio or visual notifications, notifications to a device or server. Accordingly a more complete and detailed overview of the plurality of luminaire heads situation is obtained.

According to an exemplary embodiment, the luminaire notification module is configured to control a driver for driving a light source of the luminaire head in accordance with the received position information data. In this manner, information related to the position information data can be communicated to the field operator in a visual way that is more noticeable on site.

According to a preferred embodiment, the luminaire notification module is configured to control the driver such that the light source emits light according to a pattern which is dependent on the required correction. In this way, the correction is communicated in a codified way which is easily identifiable and understandable for the field operator. In an embodiment, the light source may emit light with a pattern increasing or decreasing in frequency as the position of the luminaire head goes closer or further, respectively, from the correct position. In another embodiment, there might be three different light patterns corresponding each to a different angle, e.g. yaw, roll, pitch, to be corrected.

According to an exemplary embodiment, the luminaire notification module is configured to generate an audio signal in accordance with the received position information data. In this manner, there is provided another easily perceivable source to communicate to the field operator information related to the position information data.

According to a preferred embodiment, the luminaire control system further comprises a mobile device with a display, wherein the at least one notification module comprises a notification module included in the mobile device, and the notification module is configured to display information to the field operator based on the position information data for each luminaire head. In this way, the field operator receives information related to the position information data on a more convenient support to use, e.g. laptop, smartphone, tablet. Additionally, the use of such a support allows presentation of the data in a more user-friendly and accurate way by for example enhancing the visibility of the luminaire heads being incorrectly positioned.

According to an exemplary embodiment, the notification module in the mobile device is configured to display an overview representing the position information data for each luminaire head. In this manner, the field operator can visualize more efficiently for which luminaire heads corrections of the angular positioning are needed.

According to a preferred embodiment, the notification module is configured to display a geographical map indicating at least the luminaire heads for which the position information data indicates that the angular positioning is not correct. In this way, it is more apparent to the field operator where the luminaire heads to be maintained are and organization of the maintenance can be improved.

According to an exemplary embodiment, the notification module is configured to display a geographical map indicating the luminaire heads for which the position information data indicates that the angular positioning is correct in a first manner and the luminaire heads for which the position information data indicates that the angular positioning is not correct in a second manner different from the first manner. In this manner, correctly positioned and incorrectly positioned luminaire heads are clearly identified on the display for the field operator and are linked directly to their location on site to facilitate the work of the field operator.

According to a preferred embodiment, the sensor assembly comprises one or more of the following sensors: an accelerometer, a GPS receiver. In this way, complete positioning data of the luminaire head is obtained by sensors, e.g. one or more accelerometers, provided to the luminaire head. The measurements may concern one or more of the roll angle, yaw angle, and pitch angle, and are measured with respect to a mounting base of the luminaire head. In this manner, angular positioning is obtained with a precise system.

Alternatively or in addition, the sensor assembly may comprise any one or more of the following: an optical sensor such as a light sensor, and image sensor, a camera; a level sensor; a hall-effect sensor, etc. More generally, any sensor capable of determining a measure for at least one tilt angle may be used. In addition, a sensor of the sensor assembly may be used to determine other information, such a light pattern on a ground surface e.g. obtained via a camera. Such information may also be used by the remote device to determine whether the luminaire head is positioned correctly and to determine the required correction.

According to an exemplary embodiment, the control module is further configured for controlling the sensor assembly to perform measurements during a second normal operation period ($\Delta t2$) after the first period ($\Delta t1$); wherein a first measurement frequency (f1) during the first period is higher than a second measurement frequency (f2) during the second period. In this manner, frequency of the measurements can be changed depending on the current operation mode of the luminaire head, e.g. high frequency during installation or maintenance, low frequency during regular use. The frequency of measurements by the sensor assembly may be controlled by a control module and may depend on the working mode of the luminaire head, e.g. installation mode, regular mode. In an embodiment, the measurements are completed every few seconds or less in an installation mode of the luminaire head to allow a field operator to have a feedback on the corrections brought to the position of the luminaire head in real time. In another embodiment, the measurements are completed once a day in a regular working mode to verify whether an unplanned occurrence modified the positioning of the luminaire head and maintenance is needed.

According to a preferred embodiment, the control module is configured for controlling the sensor assembly to perform measurements during a second normal operation period ($\Delta t2$) after the first period ($\Delta t1$); and for controlling the communication through the communication interface such that measurement data is sent with a first frequency (f1') in time during said first period ($\Delta t1$) and with a second frequency (f2') in time during the second period, wherein the first frequency (f1') in time is higher than the second frequency (f2') in time. In this way, the field operator receives data collected by the sensor assembly corresponding to the measurement frequency in an appropriate way.

According to a preferred embodiment, the remote device is configured to make a comparison of the received measurement data from a set of luminaire heads of the plurality of luminaire heads and to determine the position information data based on the comparison. For example, it may be desirable that luminaire heads of the same street are positioned at the same angular position, and from the comparison it can then be decided which one or more luminaire heads need to be adjusted.

The communication interface may be configured to communicate either directly or indirectly with the remote device. The remote device may be any device remote from the luminaire head, e.g. a remote server, a mobile device (such as a smartphone, tablet or laptop), another luminaire control system, etc. The communication may be done using a long-distance communication protocol and/or using a short-distance communication protocol. For example, the communication may be done through a cellular network or may be done through a mesh network using e.g. a Zigbee protocol. In a possible embodiment, the communication is done using a short-distance communication protocol and a long-distance communication protocol, wherein the measured data is first sent to a communication interface of a nearby other luminaire head using the short-distance communication protocol, and the communication interface of this nearby other luminaire head then communicates the measured data using the long-distance communication protocol to the remote device, e.g. a remote server. The communication interface of this nearby other luminaire head may be used by one or more luminaire control systems which can only communicate using the short-distance communication protocol and are not capable of communicating using the long-distance communication protocol. In another possible embodiment, the communication by the communication interface is done directly to a remote device, e.g. a remote server, using a long-distance communication protocol.

According to an exemplary embodiment, the control module may be included in a housing of the luminaire head or outside a housing of the luminaire. In some embodiments, the control module may be included in a separate controller, e.g. a controller connected to a luminaire housing through a socket such as a NEMA socket. The communication interface may be integrated with the control module.

In other embodiments the control module and/or the communication interface may be integrated in a driver of the light source. More in particular, a driver housing may be provided with externally accessible receiving means configured for receiving one or more pluggable modules comprising circuitry. Also, the driver housing may be provided with one or more connector elements connected to the circuitry of a pluggable module, when the module is plugged in the receiving means. Using such a pluggable module, the luminaire driver may be provided with an enhanced functionality, e.g. a functionality allowing communicating with the sensor assembly. For example, the control module or a portion thereof may be provided as a pluggable module. Such embodiments have been described in detail in patent application PCT/EP2017/065304 filed on 21 Jun. 2017 in the name of the applicant, which is included here in its entirety by reference. In a possible embodiment the driver may be further configured to power/drive the sensor assembly.

Optionally this powering/driving of the sensor assembly may be controlled by the control module which may be at least partially integrated in a pluggable module.

According to an exemplary embodiment, the measured data may be automatically sent, after having performed the measurements. Alternatively or in addition, the communication interface may be configured to receive a request for receiving measured data e.g. from the remote device or from a notification module, and to send in response the measured data to the remote device. In other words, a push mechanism and/or a pull mechanism may be used to transmit the measured data to the remote device.

According to a further aspect of the invention, there is provided a method for notifying a field operator. The method comprises for each luminaire head of a plurality of luminaire heads:
acquiring a measure for at least one tilt angle representative for an angular positioning of the luminaire head;
controlling the acquiring such that the measure acquisition is performed during a first period upon activation of the luminaire head after installation thereof on a mounting base;
determining position information data of the luminaire head, based on the acquired measurement data, said position information data indicating whether the luminaire head is positioned correctly, and optionally comprising information about the required correction;
notifying a field operator present at a location near the plurality of luminaire heads, based on the determined position information data.

Preferably, the determining of position information data is performed at a remote device.

According to a preferred embodiment, the controlling of the acquiring further comprises controlling the acquiring such that the acquiring is performed during a second normal operation period after the first period; wherein a first measure acquisition frequency during the first period is higher than a second measure acquisition frequency in the second period.

According to a preferred embodiment, acquired measurement data are sent to a remote device, and the determining of position information data is performed at the remote device based on the received acquired measurement data. According to a preferred embodiment thereof, the controlling of the acquiring further comprises controlling the acquiring such that the acquiring is performed during a second normal operation period after the first period; and the controlling further comprises controlling a communication of acquired measurement data to the remote device such that measurement data is sent with a first frequency in time during said first period and with a second frequency in time during the second period, wherein the first frequency in time is higher than the second frequency in time.

According to an exemplary embodiment, the notifying further comprises controlling the driving of a light source of the luminaire head in accordance with the received positioned information data.

According to an exemplary embodiment, the notifying comprises controlling of the driving of the light source such that the light source emits light according to a pattern which is dependent on the required correction.

According to an exemplary embodiment, the notifying comprises generating an audio signal in accordance with the received position information data.

According to an exemplary embodiment, the notifying further comprises displaying on a mobile device with a display information to the field operator based on the position information for each luminaire head. Optionally, the displaying further comprises displaying an overview representing the position information data for each luminaire head. The displaying may further comprise displaying a geographical map indicating at least the luminaire heads for which the position information data indicates that the angular positioning is not correct; and/or displaying a geographical map indicating one or more luminaire heads for which the position information data indicates that the angular positioning is correct in a first manner and one or more luminaire heads for which the position information data indicates that the angular positioning is not correct in a second manner different from the first manner.

According to an exemplary embodiment, the determining comprises making a comparison of the acquired measurement data from a set of luminaire heads of the plurality of luminaire heads and determining the position information data based on the comparison.

According to a further aspect of the invention, there is provided a computer program comprising computer-executable instructions to perform the method, when the program is run on a computer, according to any one of the steps of any one of the embodiments disclosed above.

According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

The skilled person will understand that the hereinabove described technical considerations and advantages for luminaire head embodiments also apply to the below described corresponding method embodiments, mutatis mutandis.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

DESCRIPTION OF EMBODIMENTS

Figure 1:
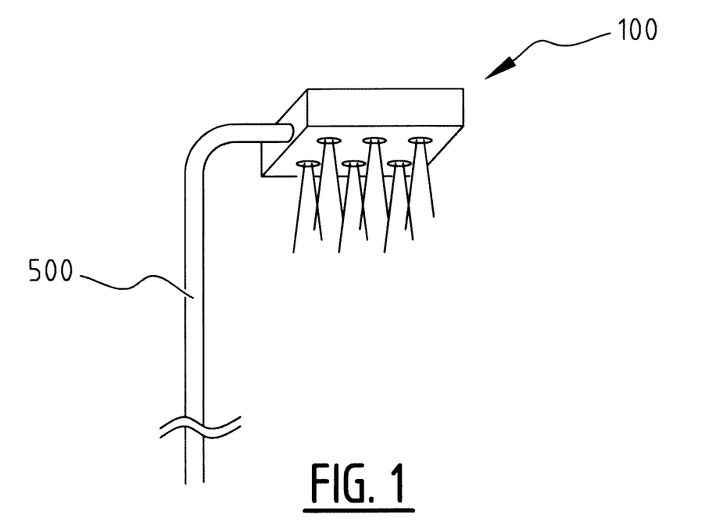
FIG. 1 shows a perspective view of an exemplary embodiment of a luminaire.

FIG. 1 shows a perspective view of an exemplary embodiment of a luminaire. The luminaire may comprise a luminaire head 100 and a mounting base 500. The luminaire head 100 may be provided to the mounting base 500. The mounting base 500 may be a pole, a wall, a ceiling, or any other support apt to bear the luminaire head 100. The mounting base 500 may be used to bear one or more luminaire heads 100.

Figure 2A:
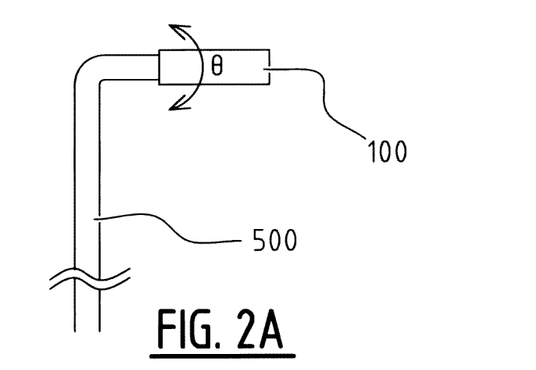
FIGS. 2A-2C shows further exemplary views of a luminaire.
Figure 2B:
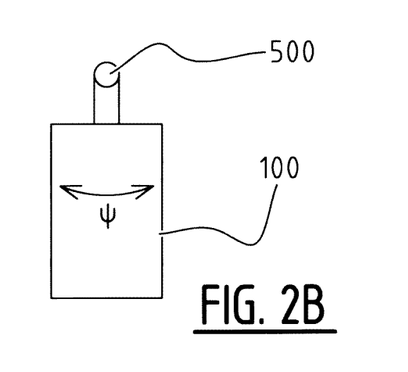
Figure 2C:
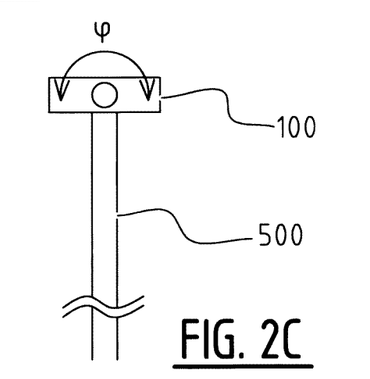

FIGS. 2A-2C schematically illustrate further exemplary embodiments of a luminaire. The luminaire head 100 is supported by the mounting base 500, e.g. a pole. As illustrated in the embodiments of FIGS. 2A-C, an angular positioning of the luminaire head 100 with respect to the mounting base 500 may be defined by three angles representing each a tilt angle respective to three orthogonal axes, namely the pitch angle ($\theta$), the yaw angle ($\psi$), and the roll angle ($\varphi$). The angular positioning of the luminaire head 100 may be measured in its rest frame by a sensor assembly 110.

Figure 3:
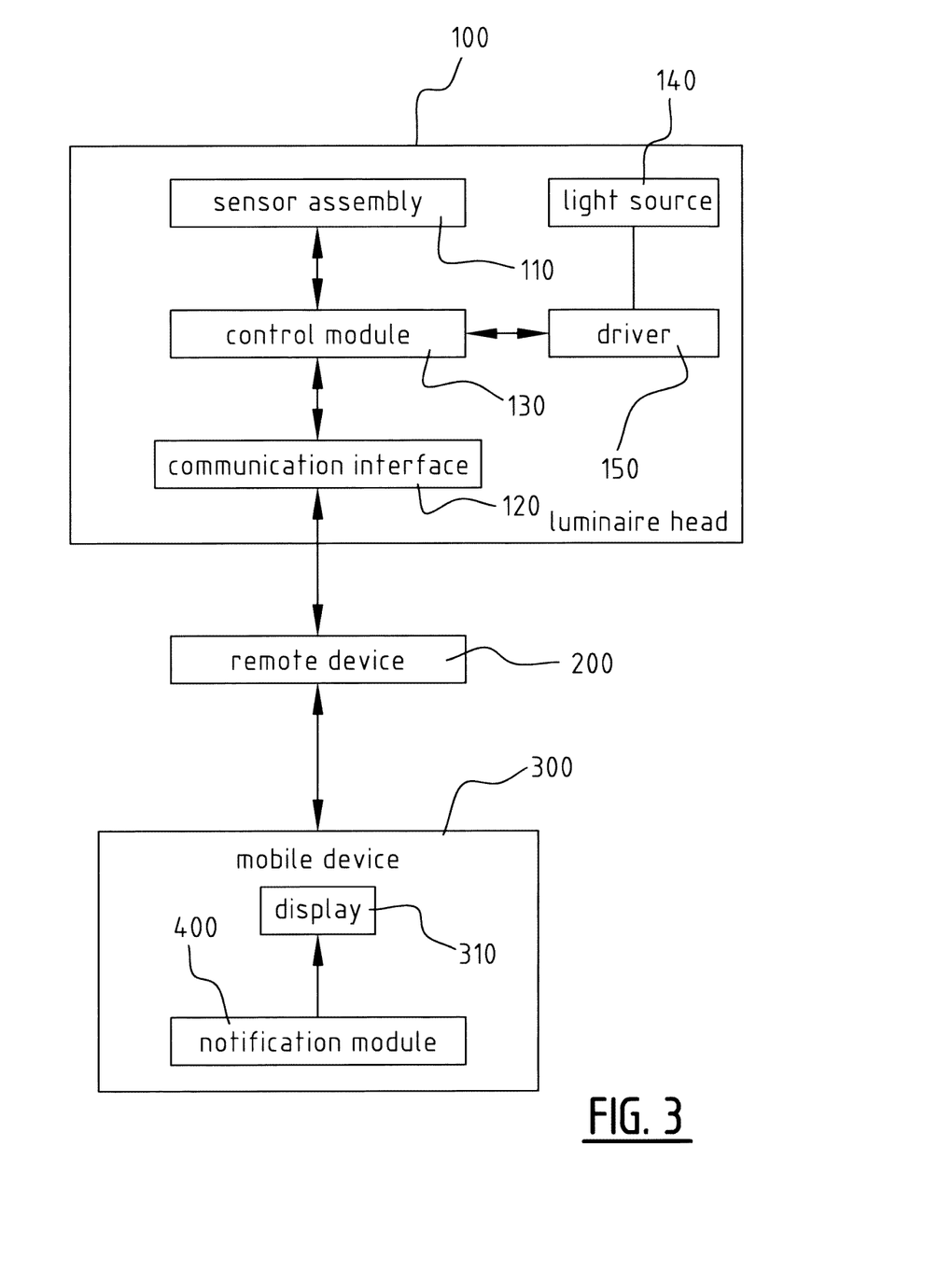
FIG. 3 schematically illustrates an exemplary embodiment of a luminaire control system according to the invention.

FIG. 3 schematically illustrates an exemplary embodiment of a luminaire control system according to the present invention. The luminaire control system comprises a plurality of luminaire heads 100 (only one thereof is shown), a remote device 200, and a mobile device 300.

The luminaire head 100 comprises a sensor assembly 110, a communication interface 120, a control module 130, a light source 140, and a driver 150. The control module 130 may be adapted for controlling the driver 150 for driving the light source 140.

The sensor assembly 110 may be included in the luminaire head 100, but may also be added as an external module or may be already present during the installation phase of the luminaire head 100. The sensor assembly 110 may comprise an accelerometer, a GPS receiver, a camera, a level sensor, a Hall-effect sensor, such that a tilt position of the luminaire may be evaluated, e.g. yaw, pitch, roll angle.

The control module 130 is configured for controlling the sensor assembly 110 to perform measurements. The measurements may be made during a first period ($\Delta t1$) upon activation of the luminaire head 100 after installation on the mounting base 500. The measurements may be made during a second normal operation period ($\Delta t2$) after the first period ($\Delta t1$). The first and the second periods may correspond to different working periods of the luminaire, e.g. installation, normal running, maintenance. There may be more than two different periods.

The control module 130 is configured for controlling the communication through the communication interface 120 such that measurement data from said first period is communicated to the remote device 200, e.g. a server or a plurality of servers. Each luminaire head 110 of the plurality of luminaire heads 100 may be associated to an identifier. Identification of the luminaire head 100 corresponding to the measurement data from the first period may also be communicated to the remote device 200. Additional data may be communicated to the remote device 200 by the control module 130, e.g. geographical position of the luminaire head.

The identifier may be any identification allowing identifying a luminaire and can be e.g. an address, a unique code, a serial number, an identifier of a component of the luminaire such as an identifier of the control module and/or of a light module containing the light source, etc.

The communication interface 120 is adapted for communicating with the remote device 200. Communication with the remote device 200 may be established wirelessly or in a wired manner. Data may be sent via a wireless network, e.g. Bluetooth, Wifi, Zigbee, LORA (IoT), IR, or via a wired network, e.g. Ethernet, DALI, DMX, RS485, USB. The remote device 200 may be a remote server.

The remote device 200 is configured to determine position information data for each luminaire head 100, based on the received measurement data, said position information data indicating whether the luminaire head 100 is positioned correctly, and optionally information about the required correction. In an exemplary embodiment according to FIG. 3, the remote device 200 may be receiving measurement data from a luminaire head 100 and the identifier of the luminaire head 100. Optionally, the remote device 200 may be configured to make a comparison of the received measurement data from a set of luminaire heads 100 of the plurality of luminaire heads 100 and to determine the position information data based on the comparison.

A predetermined angular position of the luminaire head 100 may be stored in the remote device 200 and retrieved based on the identifier received. The remote device 200 may compare the received measurement data of the luminaire head 100 to the predetermined angular position. From the difference between the received measurement data and the predetermined angular position of the luminaire head 100, it may be derived if the luminaire head is correctly positioned, and optionally a correction may be derived. Additional data may be stored in the remote device 200 associated with the luminaire head 100, e.g. maintenance history, functioning history, geographical position, optics parameters, and sent to the mobile device 300. A person of skill in the art would readily recognize that such a system associated with the remote device 200 may be deployed for a plurality of luminaire heads 100.

To very whether the position is correct the received measured data is compared with predetermined data such as a predetermined angular position. Such predetermined data may be determined based on a photometry study of the luminaire head done before the commissioning.

The remote device 200 may send data to the mobile device 300. The mobile device 300 may comprise a display 310 and a notification module 400. The notification module 400 is configured for receiving the position information data from the remote device 200 and for notifying a field operator accordingly. The mobile device 300 may be utilized by the field operator to obtain an overview of the angular positioning of the plurality of luminaire heads 100 at a specific site. The mobile device 300 may also be utilized by a remote operator to examine angular positioning of the plurality of luminaire heads 100 remotely. The mobile device 300 may be any one of a smartphone, a tablet, a laptop, augmented reality glasses, etc.

The notification module 400 is configured to display information to the field operator based on the position information data for each luminaire head 100. The display 310 may show an overview representing the position information data for each luminaire head 100 as a list or a table. The display 210 may, instead or additionally, exhibit a geographical map indicating at least the luminaire heads 100 for which the position information data indicates that the angular positioning is not correct. The geographical position of the luminaire heads 100 may have been sent from the remote device 200 based on stored data or data measured from a GPS receiver comprised in the corresponding luminaire head 100.

In addition, the notification module 400 may be configured to display a geographical map indicating the luminaire heads 100 for which the position information data indicates that the position is correct in a first manner and the luminaire heads 100 for which the position information data indicates that the position is not correct in a second manner different from the first manner. The correctly positioned luminaire heads 100 may be indicated in green and the incorrectly positioned luminaire heads 100 may be indicated in red. The notification module 400 may be configured to enhance on the display 310 the visualization of the correctly or incorrectly positioned luminaire heads 100 and to associate to each luminaire head 100 incorrectly positioned the correction needed such that the corresponding luminaire head 100 is correctly positioned.

Corrections may then be carried over to the angular positioning of the luminaire head 100 by adjusting fixing means, e.g. braces, bolts, mounting tube, hinges, or adjusting optical means, e.g. lenses, reflectors.

Figure 4:
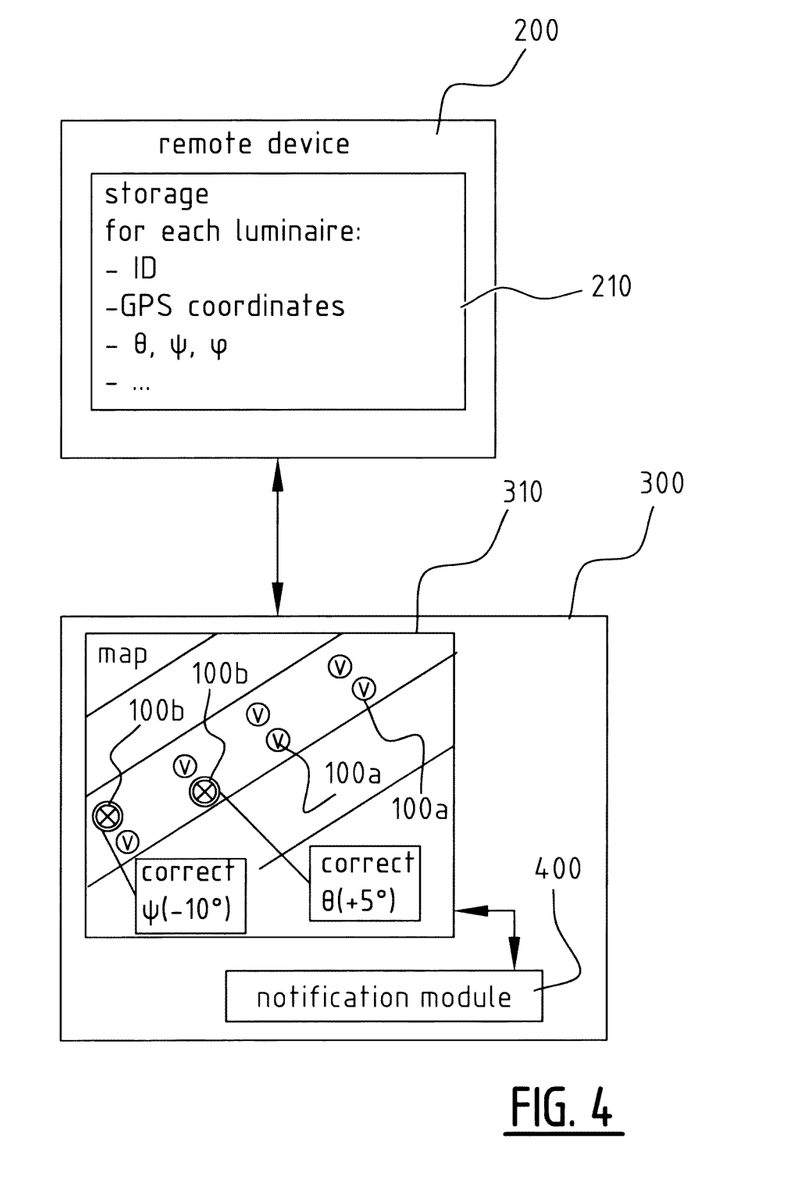
FIG. 4 schematically illustrates an exemplary embodiment of a luminaire control system according to the invention.

FIG. 4 schematically illustrates an exemplary embodiment of a luminaire control system according to the present invention. The luminaire control system comprises a remote device 200, e.g. a remote server, and a notification module 400 of a mobile device 300 comprising a display 310.

The remote device 200 may comprise a storage unit 210 to store data associated to each luminaire head 100 comprised in the luminaire control system. The stored data may include an identifier of the luminaire head 100, GPS coordinates, predetermined angular position ($\theta$, $\psi$, $\varphi$), maintenance history, luminaire optical parameters, functioning history, etc.

The remote device 200 may send the relevant data to the notification module 400 in the mobile device 300. The data may be sent via a wireless network, e.g. Bluetooth, Wifi, Zigbee, LORA (IoT), IR, or via a wired network, e.g. Ethernet, DALI, DMX, RS485, USB. The notification module 400 is configured to display information based on the received data on the display 310 to the field operator.

In the embodiment illustrated in FIG. 4, the display 310 shows a geographical map of a road section comprising eight luminaire heads 100 located on either side of the road section, i.e. four luminaire heads 100 located on each side. The luminaire heads 100 locations are added on the geographical map of the road section. The correctly and incorrectly positioned luminaire heads 100a, 100b are differentiated by a visual sign; for example, correctly placed luminaire heads 100a may be indicated by a tick mark, and incorrectly placed luminaire heads 100b may be indicated by a cross mark. The correction needed for the incorrectly placed luminaire heads 100b may be joined to the cross marks.

Figure 5:
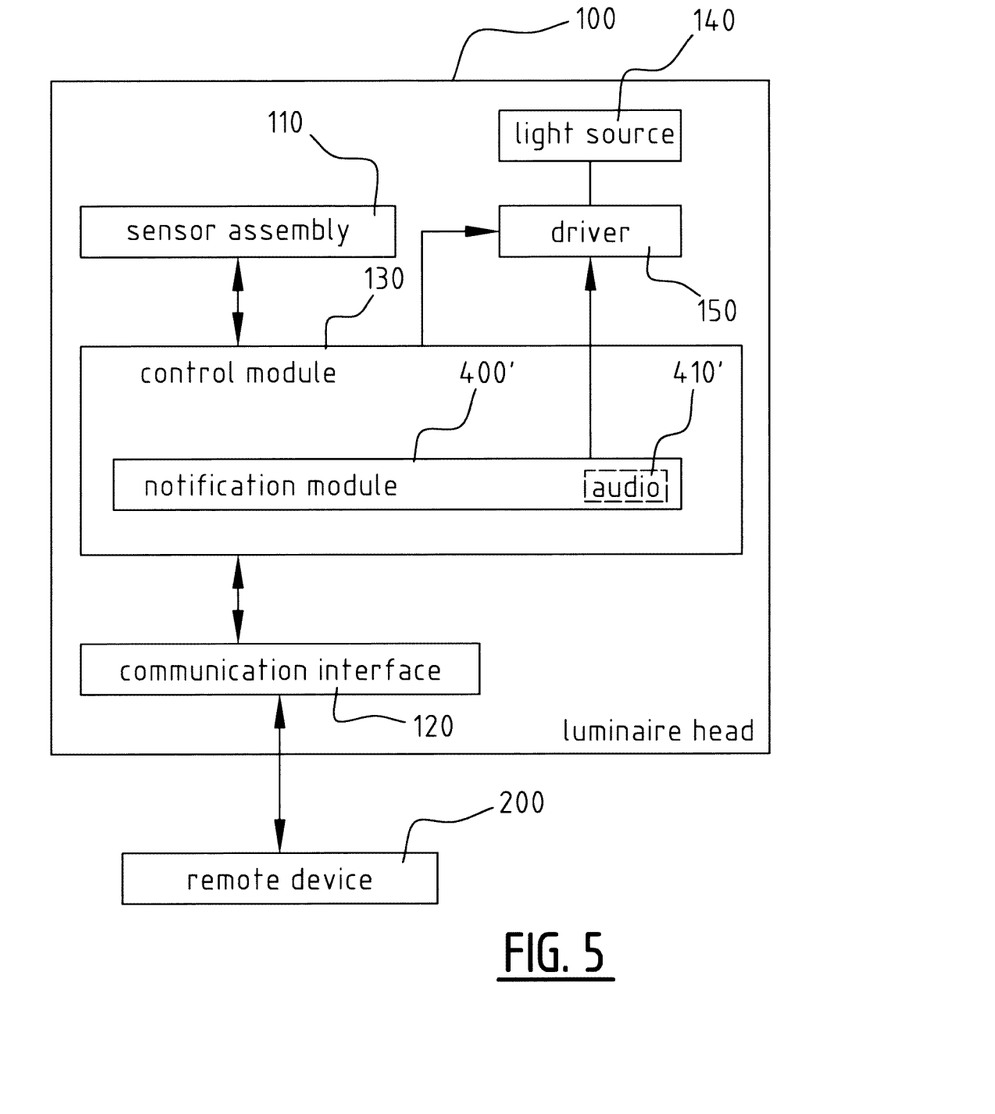
FIG. 5 schematically illustrates another exemplary embodiment of a luminaire control system according to the invention.

FIG. 5 schematically illustrates another exemplary embodiment of a luminaire control system according to the present invention. The luminaire control system comprises a plurality of luminaire heads 100 (only one thereof is shown) and a remote device 200. The luminaire head 100 comprises a sensor assembly 110, a communication interface 120, a control module 130, a light source 140, and a driver 150.

The control module 130 may comprise a luminaire notification module 400'. The luminaire notification module 400' is configured to control the driver 150 for driving the light source 140 of the luminaire head 100 in accordance with received position information data. The sensor assembly 110 may measure a tilt position of the luminaire head 100. The measurements by the sensor assembly 110 may be controlled by the control module 130 and sent via the communication interface 120 to the remote device 200. The remote device 200, after processing the received measurement data, may send to the luminaire notification module 400' position information data via the communication interface 120.

In an exemplary embodiment, the luminaire notification module 400' may control the driver 150 to increase the energy supply to the light source 140 to compensate for an incorrect positioning of the luminaire head 100. In another embodiment, the field operator is installing the luminaire head 100 and needs to place it at the correct angular position. The luminaire notification module 400' may control the driver such that the light source 140 emits light according to a pattern which is dependent on the required correction. According to an exemplary embodiment, the pattern may increase in frequency as the luminaire head 100 is getting closer to the correct position. According to another exemplary embodiment, the pattern may differ depending on the tilt angle currently corrected. In other embodiments the notification module 400' may control the driver to modify the light source 140 dimming in accordance with the position information data.

The luminaire notification module 400' may comprise an audio unit 410'. The luminaire notification module 400' may complement or replace the light signals with audio signals in accordance with the position information data by using audio signals with a pattern or direct instructions.

Figure 6:
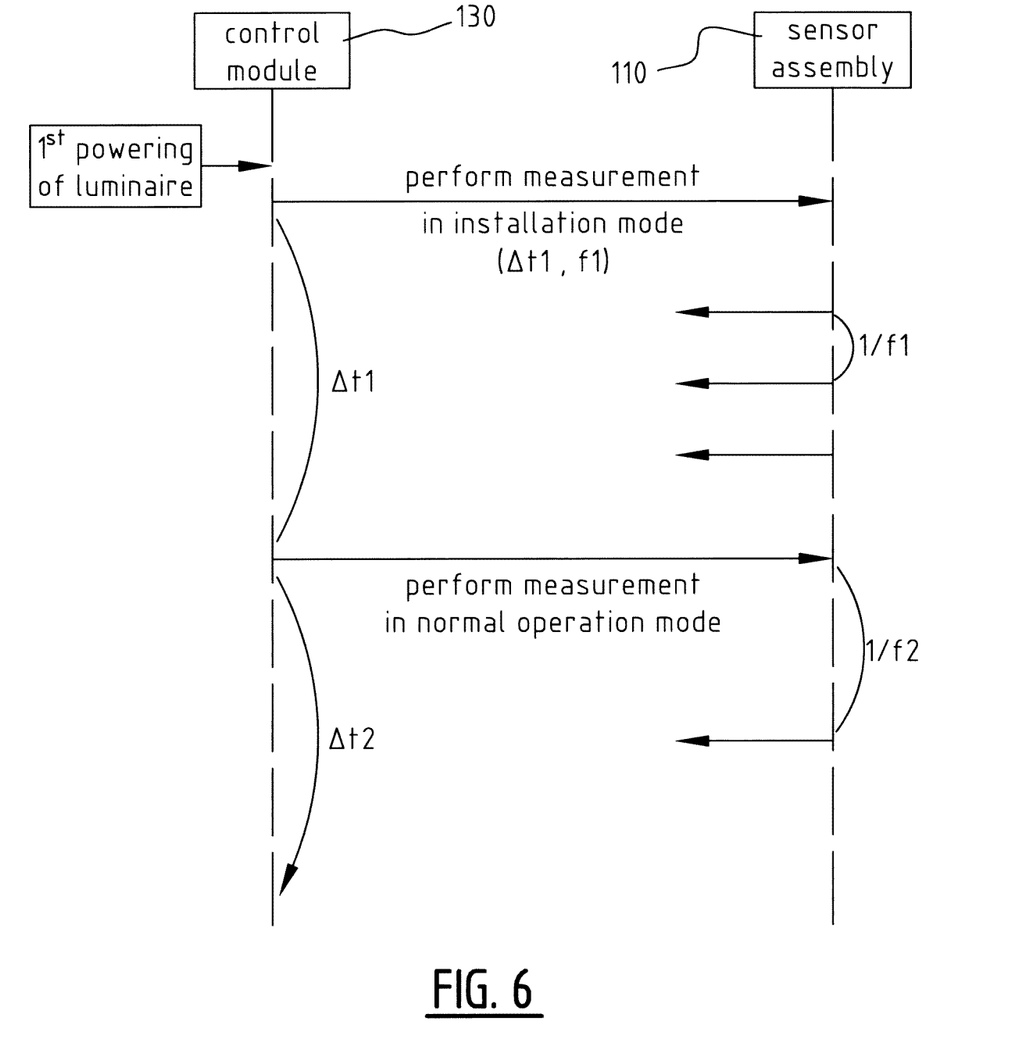
FIG. 6 schematically illustrates another exemplary embodiment of a luminaire control system and method according to the invention.

FIG. 6 schematically illustrates another exemplary embodiment of a luminaire control system and method according to the present invention. The luminaire control system comprises a control module 130 and a sensor assembly 110.

After fixing the luminaire head 100 on the mounting base 500, the luminaire head 100 may optionally be connected to already present or new communication modules and/or sensing modules, e.g. the sensor assembly 110. Once connected, a first powering of the luminaire is performed and different parameters of the luminaire are controlled to complete the installation of the luminaire.

The sensor assembly 110 may comprise one or more sensors, e.g. accelerometer, such that at least one tilt angle of the luminaire head 100 is measured with respect to a rest frame representative for an angular positioning of the luminaire head 100 with respect to the mounting base 500. The control module 130 is adapted for controlling the sensor assembly 110 to perform measurements.

During completion of the luminaire installation, there is an installation period ($\Delta t1$). During the installation period ($\Delta t1$), the control module 130 is configured for controlling the sensor assembly 110 to perform measurements at a first measurement frequency (f1). The field operator may be present on site to complete the luminaire installation and may need the measurements to be performed at a frequency in a predefined range. The control module 130 may send the measured position information data accompanied with the identifier of the luminaire head 100 via the communication interface 120 at a first communication frequency (f'1). By having a sufficiently high measurement and a high communication frequency (f1, f'1), the field operator may have a near-constant feedback to position the luminaire head 100 efficiently and accurately.

After the installation period ($\Delta t1$), the luminaire may enter a normal operation period ($\Delta t2$). During the normal operation period ($\Delta t2$), the control module is configured for controlling the sensor assembly 110 to perform measurements at a second measurement frequency (f2). The field operator may be absent from the site. The measurements may be consulted remotely by a remote operator. The measurements may be performed at frequency lower than the first measurement frequency (f1). The control module 130 may send the measured position information data accompanied with the identifier of the luminaire head 100 via the communication interface 120 at a second communication frequency (f'2) lower than the first communication frequency (f'1). By having a regular measurement and communication frequency (f2, f'2), it is possible to monitor remotely changes in the angular positioning of the luminaire head 100 due to unforeseen occurrences, e.g. from a collision, application of sudden external forces, slippage. In another embodiment, the control module 130 may be configured for controlling the communication via the communication interface 120 such that it is triggered by an angular positioning change above a predetermined value.

A person skilled in the art will recognize that embodiments according to the present invention include luminaires with additional periods other than the installation and normal operation period ($\Delta t1$, $\Delta t2$) which may require different measurement and communication frequencies.

Figure 7:
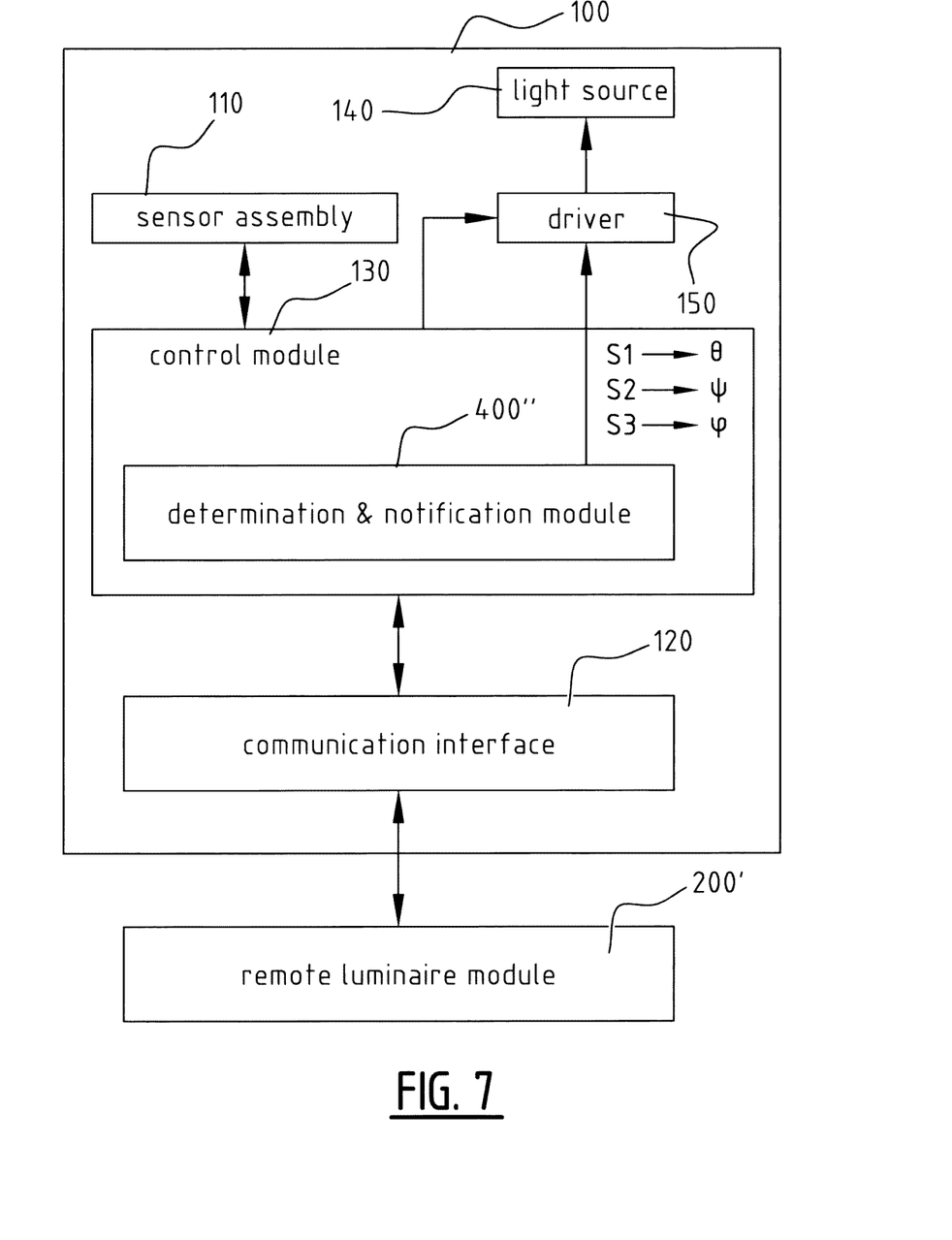
FIG. 7 schematically illustrates another exemplary embodiment of a luminaire control system according to the invention.

FIG. 7 schematically illustrates another exemplary embodiment of a luminaire control system according to the present invention. The luminaire head 100 comprises a sensor assembly 110, a communication interface 120, a control module 130, a light source 140, and a driver 150. The luminaire control system may further comprise a remote luminaire module 200'.

In the embodiment illustrated in FIG. 7, the remote luminaire module 200' may be connected wirelessly or in a wired manner to one or more luminaire heads 100 of the luminaire via the communication interface 120. The remote luminaire module 200' may be a general purpose module configured for storing data and controlling a range of parameters related to the luminaire, including parameters related to one or more luminaire heads 100. In an exemplary embodiment, the remote luminaire module 200' may be remote for at least one luminaire a plurality of luminaires and may be comprised in at least one luminaire or in a cabinet near the plurality of luminaires.

The control module 130 is configured for sending measurement data from the sensor assembly 110 to the remote luminaire module 200' via the communication interface 120. The remote luminaire module 200' may determine a position information data of the luminaire head with respect to the mounting base 500 from the measured data of the sensor assembly 110 respective to a rest frame. The position information data may be sent to the determination and notification module 400" via the communication interface 120.

The control module 130 may comprise a determination and notification module 400". The determination and notification module 400" may determine whether the position information data indicates the correct angular positioning of the corresponding luminaire head 100. Subsequently, during a period when a field operator is present, the determination and notification module 200' may control the driver 150 for controlling the energy supply of the light source 150 such that the filed operator is notified in accordance with the correction to be carried over.

Figure 8:
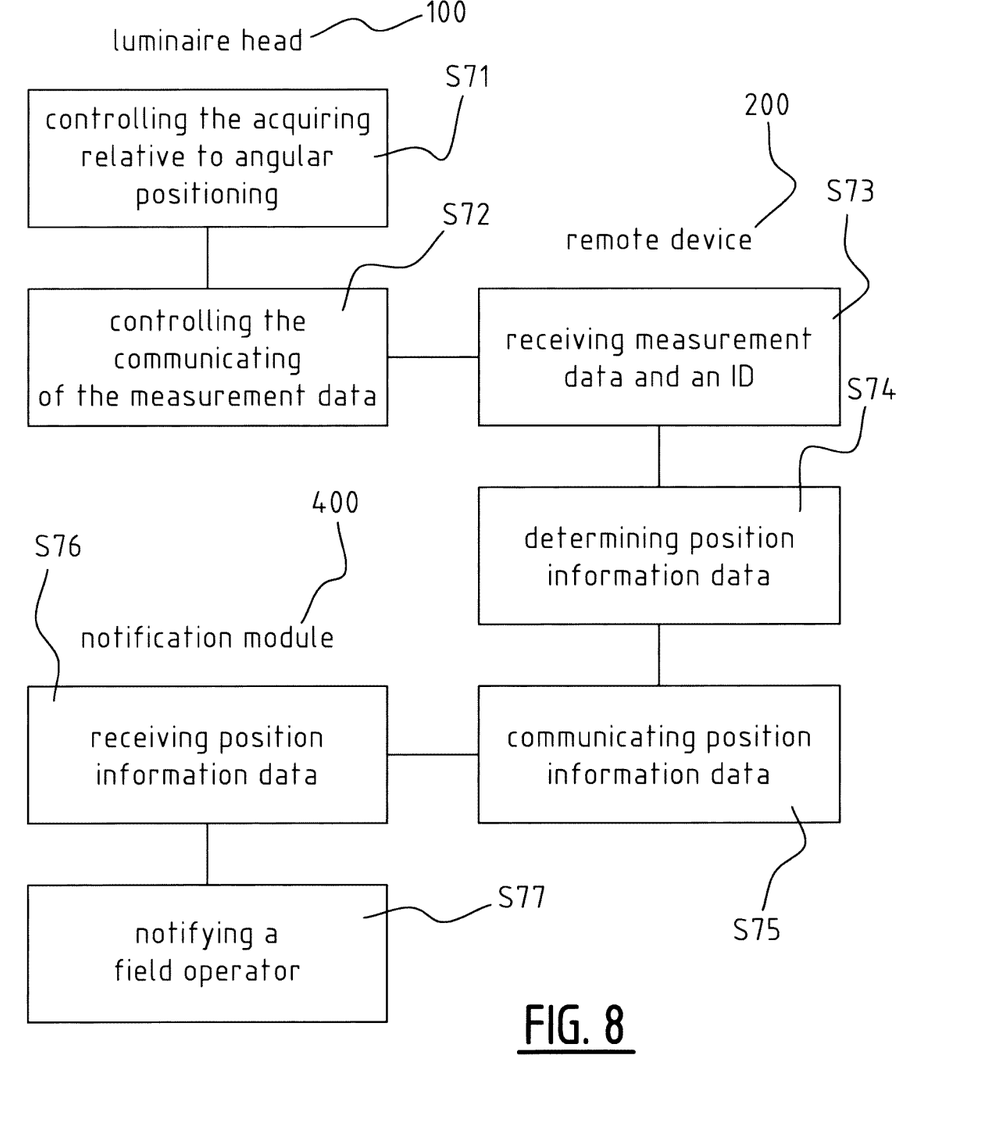
FIG. 8 illustrates schematically an exemplary embodiment of a method for notifying a field operator according to the invention.

FIG. 8 illustrates schematically an exemplary embodiment of a method for notifying a field operator according to the present invention. The method is to be applied in a luminaire control system comprising a plurality of luminaire heads 100, a remote device 200, and a notification module 400. The notification module may 400 be located in the luminaire head 100, or in a mobile device 300, e.g. smartphone, tablet, laptop, altered reality glasses. The remote device 200 may be a remote server for handling a plurality of luminaire heads 100.

In a first step S71 at the luminaire head 100, there is a controlled acquiring of a measure of a tilt angle of the luminaire head 100 with respect to a rest frame representative of the angular positioning of the luminaire head with respect to the mounting base 500. Optionally, acquiring of a measure of a geo-position of the luminaire head 100 may be performed. The measure acquisition is controlled such that it is performed upon activation of the luminaire head after installation of the luminaire head 100 on a mounting base 500, e.g. wall, ceiling, pole post. Measure acquisition is performed at a first frequency (f1) during an installation period ($\Delta t1$). During a normal operation period ($\Delta t2$), generally after the installation period, measure acquisition is performed at a second frequency (f2). The first frequency (f1) is higher than the second frequency (f2) to accommodate for a difference between an active installation by a field operator during the installation period, and a less active monitoring during the normal operation period. Additional frequencies during different periods may be defined according to which measure acquisition will be controlled depending on the actions taken on the luminaire head 100.

In a second step S72 at the luminaire head 100, there is a controlled communicating of the measurement data measured in the previous step S71. The communication may be performed at a first frequency (f1) during the installation period (Δt1). The communication may be performed at a second frequency (f2) lower than the first communication frequency (f1) during the normal operation period (Δt2). Communication may be achieved via a wireless network, e.g. Bluetooth, Wifi, Zigbee, LORA (IoT), IR, or via a wired network, e.g. Ethernet, DALI, DMX, RS485, USB. The luminaire head 100 communicates with the remote device 200.

In a first step S73 at the remote device 200, the sent measurement data is received. An identification of the luminaire head 100 is joined to the measurement data. Additionally, data relative to the geo-positioning of the luminaire head 100 may be received.

In a second step S74 at the remote device 200, position information data is determined based on the received measurement data. The identification of the luminaire head 100 allows retrieving a predetermined angular positioning of the luminaire head. Comparing the received measurement data to the predetermined angular positioning enables to obtain the position information data with respect to the mounting base 500. Optionally, the difference between the predetermined angular positioning and the received measurement data will give information about the required correction. Optionally, the determining may comprise making a comparison of the acquired measurement data from a set of luminaire heads of the plurality of luminaire heads and determining the position information data based on the comparison. For example, it may be desirable that the angular position of the luminaire heads is the same of all luminaire heads of the set (e.g. a set of luminaire heads of the same street), and a comparison between the received measurement data of the set will allow determining which one or more luminaire heads of the set need to be adjusted.

In a third step S75 at the remote device 200, the position information data is communicated to the notification module 400. Optionally, information about the required angular correction is also communicated to the notification module. Communication may be achieved via a wireless network, e.g. Bluetooth, Wifi, Zigbee, LORA (IoT), IR, or via a wired network, e.g. Ethernet, DALI, DMX, RS485, USB.

In a first step S76 at the notification module 400, the position information data is received.

In a second step S77 at the notification module 400, the field operator is notified in accordance with the received position information data. Notifying may be achieved by controlling the driving of a light source 140 comprised in the luminaire head 100 such that the light source 140 emits a light signal following a specific pattern in function of the tilt angle modified and changes in the pattern and/or frequency depending on the amount of correction required to reach the correct angular positioning. An audio signal may be used in the same manner as the light signal and/or incorporate direct instructions.

The notification module 400 may be comprised in the mobile device 300 equipped with the display 310. Notifying by displaying to the field operator may include displaying information on the display 310 comprising: geographical position of the plurality of luminaire heads 100, position information data for each luminaire head 100, visual enhancement of the correctly and incorrectly placed luminaire heads 100, information based on the position information for each luminaire head 100, correction required for each luminaire head 100.

A person skilled in the art would readily recognize that the steps realized at the notification module 400 may be realized with the notification module 400 being comprised in the luminaire head 100 or in the remote device 200.

A person of skill in the art would readily recognize that steps of various above-described methods can be performed by programmed computers. Herein, some embodiments are also intended to cover program storage devices, e.g. digital data storage media, which are machine or computer readable and encode machine-executable or computer-executable programs of instructions, wherein said instructions perform some or all of the steps of said above-described methods. The program storage devices may be, e.g. digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labelled as "processors" or "modules", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:
1. A luminaire control system comprising at least one luminaire head and a remote device;
  wherein each luminaire head of the at least one luminaire head comprises:

a sensor assembly configured for measuring at least one tilt angle (θ, ψ, φ) representative for an angular positioning of the luminaire head;

a communication interface configured for communicating with the remote device;

a control module configured for controlling the sensor assembly to perform measurements during a first period (Δt1) upon activation of the luminaire head after installation thereof on a mounting base; and for controlling the communication through the communication interface such that measurement data from said first period and an identification of the luminaire head is communicated to the remote device;

wherein the remote device is configured to determine position information data for the luminaire head, based on the received measurement data, said position information data indicating whether the luminaire head is positioned correctly, and optionally comprising information about the required correction;

the luminaire control system further comprising at least one notification module configured for receiving the position information data from the remote device and for notifying a field operator accordingly;

wherein the control module is further configured for controlling the sensor assembly to perform measurements during a second normal operation period (Δt2) after the first period (Δt1), wherein a first measurement frequency (f1) during the first period is higher than a second measurement frequency (f2) during the second period.

2. The luminaire control system according to claim 1, wherein the at least one notification module comprises a plurality of luminaire notification module included in the luminaire head.

3. The luminaire control system according to claim 2, wherein the luminaire notification module is configured to control a driver for driving a light source of the luminaire head in accordance with the received position information data.

4. The luminaire control system according to claim 3, wherein the luminaire notification module is configured to control the driver such that the light source emits light according to a pattern which is dependent on the required correction.

5. The luminaire control system according to claim 1, wherein the at least one notification module is configured to generate an audio signal in accordance with the received position information data.

6. The luminaire control system according to claim 1, further comprising a mobile device with a display, wherein the at least one notification module comprises a notification module included in the mobile device, and the notification module is configured to display information to the field operator based on the position information data for the at least one luminaire head.

7. The luminaire control system according to claim 6, wherein the notification module in the mobile device is configured to display an overview representing the position information data for the at least one luminaire head.

8. The luminaire control system according to claim 6, wherein the notification module is configured to display a geographical map indicating at least a luminaire head of the at least one luminaire head for which the position information data indicates that the angular positioning is not correct.

9. The luminaire control system according to claim 8, wherein the notification module is configured to display a geographical map indicating a luminaire head of the at least one luminaire head for which the position information data indicates that the angular positioning is correct in a first manner and a luminaire head of the at least one luminaire head for which the position information data indicates that the angular positioning is not correct in a second manner different from the first manner.

10. The luminaire control system according to claim 1, wherein the sensor assembly comprises one or more of the following sensors: an accelerometer, a GPS receiver, an optical sensor such as a camera or an image sensor, a level sensor, a Hall-effect sensor.

11. The luminaire control system according to claim 1, wherein the control module is configured for controlling the communication through the communication interface such that measurement data is sent with a first frequency (f1') in time during said first period (Δt1) and with a second frequency (f2') in time during the second period, wherein the first frequency (f1') in time is higher than the second frequency (f2') in time.

12. The luminaire control system according to claim 1, wherein the at least one luminaire head comprise a plurality of luminaire heads, wherein the remote device is configured to make a comparison of the received measurement data from a set of luminaire heads of the plurality of luminaire heads and to determine the position information data based on the comparison.

13. A method for notifying a field operator, said method comprising for each luminaire head of at least one luminaire head:

acquiring a measure for at least one tilt angle (θ, ψ, φ) representative for an angular positioning of the luminaire head;

controlling the acquiring such that the measure acquisition is performed during a first period (Δt1) upon activation of the luminaire head after installation thereof on a mounting base;

determining position information data of the luminaire head, based on acquired measurement data, said position information data indicating whether the luminaire head is positioned correctly, and optionally comprising information about the required correction;

notifying a field operator, based on the determined position information data;

wherein the controlling of the acquiring further comprises controlling the acquiring such that the acquiring is performed during a second normal operation period (Δt2) after the first period (Δt1); wherein a first measure acquisition frequency (f1) during the first period is higher than a second measure acquisition frequency (f2) in the second period.

14. The method according to claim 13, wherein acquired measurement data are sent to a remote device, and wherein the determining of position information data is performed at the remote device based on the received acquired measurement data, wherein the controlling of the acquiring further comprises controlling the acquiring such that the acquiring is performed during a second normal operation period (Δt2) after the first period (Δt1); and wherein the controlling further comprises controlling a communication of measurement data to a remote device such that acquired measurement data is sent with a first frequency (f'1) in time during said first period (Δt1) and with a second frequency (f'2) in time during the second period (Δt2), wherein the first frequency (f'1) in time is higher than the second frequency (f'2) in time.

15. The method according to claim 13, wherein the notifying further comprises controlling the driving of a light source of the luminaire head in accordance with the received positioned information data, wherein the notifying comprises controlling of the driving of the light source such that the light source emits light according to a pattern which is dependent on the required correction.

16. The method according to claim 13, wherein the notifying comprises at least one of generating an audio signal in accordance with the received position information data; and displaying on a mobile device with a display, information to the field operator based on the position information for the luminaire head, wherein the displaying further comprises displaying an overview representing the position information data for the luminaire head.

17. The method according to claim 16, wherein the displaying further comprises displaying a geographical map indicating at least a luminaire head of the at least one luminaire head for which the position information data indicates that the angular positioning is not correct, wherein the displaying further comprises displaying a geographical map indicating a luminaire head of the at least one luminaire head for which the position information data indicates that the angular positioning is correct in a first manner and a luminaire head for which the position information data indicates that the angular positioning is not correct in a second manner different from the first manner.

18. The method according to claim 13, wherein the determining comprises making a comparison of the acquired measurement data from a set of luminaire heads of the at least one luminaire head and determining the position information data based on the comparison.

* * * * *